UNITED STATES PATENT OFFICE.

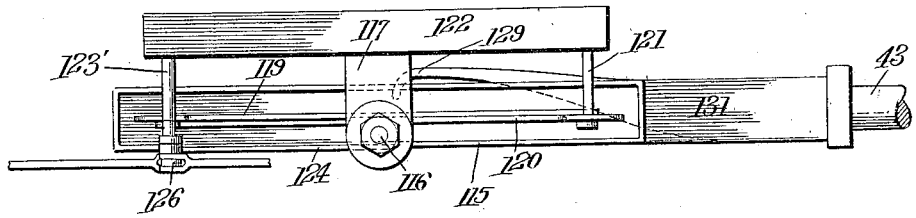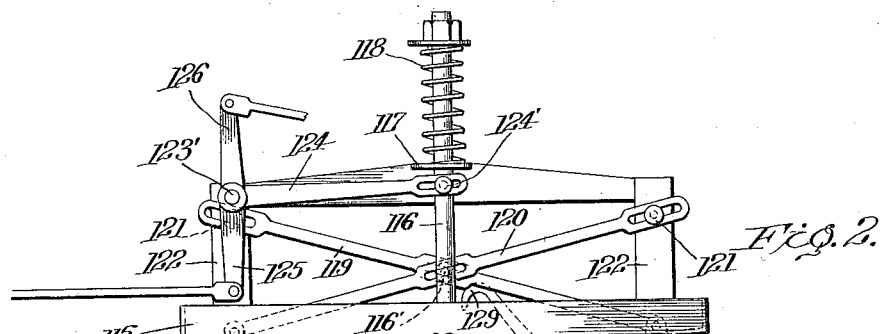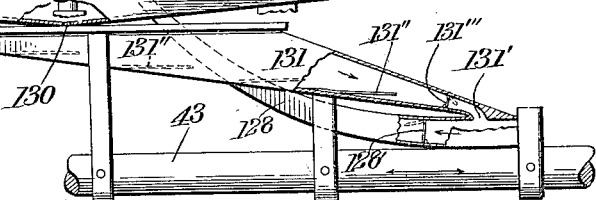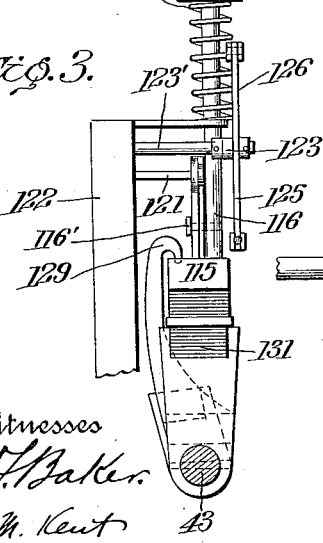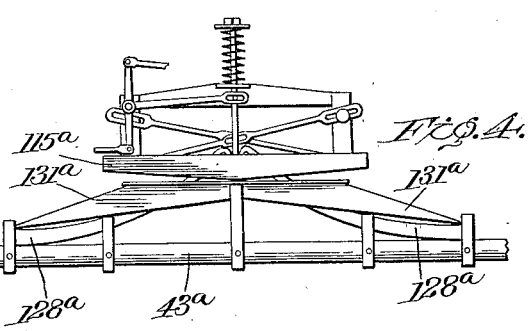

EDGAR A. BURROW, OF SAN ANGELO, TEXAS, ASSIGNOR, BY DIRECT AND MESNE ASSIGNMENTS, OF SEVENTY ONE-HUNDREDTHS TO HIMSELF AND THIRTY ONE-HUNDREDTHS TO BERNARD C. ALEXANDER AND MARY A. GUTHRIE, EXECUTRIX OF WILLIAM A. GUTHRIE, DECEASED.

GOVERNOR.

1,144,586.   Specification of Letters Patent.   Patented June 29, 1915.

Original application filed June 8, 1914, Serial No. 843,812. Divided and this application filed March 27, 1915. Serial No. 17,494.

*To all whom it may concern:*

Be it known that I, EDGAR A. BURROW, a citizen of the United States, and resident of San Angelo, Tom Green county, State of Texas, have invented certain new and useful Improvements in Governors, of which the following is a specification.

This invention relates to speed controlling mechanism and more particularly to mechanism for controlling a reciprocating element, such as an engine piston.

The present application is a division of my earlier application Serial No. 843,812, filed June 8, 1914.

It is the object of the present invention to provide a simple mechanism which will be thoroughly reliable in operation and of general application.

The features of novelty will be apparent from the following description taken in connection with the accompanying drawings, in which, Figure 1 is a plan view of a governor embodying the invention; Fig. 2 is a side elevation thereof; Fig. 3 is an end elevation of the same; and Fig. 4 is a side elevation of a modified form of the invention.

Referring to the drawings, 43 indicates a reciprocating member which, in this instance, is shown as a rod. The member 43 is connected with the mechanism to be governed (not shown) and operated in synchronism with the movements thereof. Secured on the rod 43 is a receptacle 128 for a fluid, such as mercury, and this receptacle has a tubular extension 129, the upper end of which is so arranged as to discharge the fluid into a pan 115, the latter being secured on a vertical rod 116 passing through a bracket 117 and yieldingly supported on the bracket by means of a spring 118. In order to prevent the pan 115 from moving laterally, I have provided the links 119 and 120 which are pivoted to the opposite ends of the pan and have a pin and slot connection 116′ with the rod 116. The links 119 and 120 have slots which receive the pins 121, these pins being carried by the fixed brackets 122. A rocking member 123 is suitably supported on a fixed stud or bracket 123′ and has an arm 124 which has a pin and slot connection 124′ with the rod 116, as shown.

The member 123 is also provided with the oppositely projecting arms 125 and 126 which may be connected with any suitable controlling mechanism, such as a throttle valve, for controlling the supply of energy to the part governed.

The parts, above referred to, are so arranged that with each reciprocation of the member 43 the inertia forces acting on the mercury in the receptacle 128 will cause the mercury to surge back and forth in the receptacle. When the movement of the member 43 is toward the right, as seen in Fig. 2, the mercury will rise into the extension 129 and flow therefrom into the pan 115. In order to regulate the surging of the mercury in the receptacle 128, a swinging check valve 128′ is provided which permits flow therethrough in the direction of the arrow but not in the opposite direction. The pan 115 is provided with a restricted outlet 130 in the bottom thereof and the mercury will flow through this outlet into a funnel 131 which is carried by the member 43 and returns the mercury to the receptacle 128, by means of a suitable opening 131′. Back flow in the funnel 131 is prevented by the baffle plates 131″, which may be secured to the bottom wall of the funnel, and a swinging check valve 131‴. The accumulation of the mercury in the pan 115 causes the latter to be depressed and this movement of the pan is transmitted to the arms 125 and 126 by means of the arm 124.

It will be understood that the controlling mechanism, above referred to, will be so connected with the arms 125 or 126 that the supply of energy will be reduced when the pan 115 is depressed. When the speed of reciprocation of the member 43 is below normal mercury will flow from the pan 115 faster than it is supplied thereto from the receptacle 128 and therefore the reduction of the quantity of mercury in the pan will permit the spring 118 to lift the pan and actuate the arms 125 and 126 in the opposite direction and increase the supply of energy to the part which actuates the member 43, thereby increasing the speed of reciprocation of the latter.

Referring to Fig. 4, it will be seen that I have illustrated therein a modification in which the reciprocating member 43ª carries two of the receptacles 128ª and two funnels 131ª. Both of the receptacles 128ª are adapted to discharge into the pan 115ª so that the pan will receive mercury from the receptacles on both strokes instead of only one stroke, as in the form first described. The operation of this form of the invention is similar to that of the form first described, but it will be seen that by providing two of the receptacles 128ª and discharging mercury into the pan 115ª on each stroke of the member 43ª, a much closer regulation of the speed may be obtained.

Having thus described the invention, what is claimed and desired to be secured by Letters Patent is:

1. In a governing mechanism, the combination of a reciprocating fluid receptacle, a yieldingly supported pan, means whereby the inertia forces acting on the fluid in said receptacle are utilized to convey the fluid from the receptacle to said pan, and controlling means connected with the pan and actuated by the movement thereof.

2. In a governing mechanism, the combination of a spring supported pan, controlling devices connected with said pan and actuated by the movements thereof, a fluid receptacle arranged below said pan, a tubular member for conveying the fluid from said receptacle to said pan, and means including an opening in said pan for returning the fluid from the pan to said receptacle.

3. In a governing mechanism, the combination of a spring supported pan having an opening therein for the discharge of fluid, controlling means operatively connected with said pan, a fluid receptacle arranged below said pan and adapted to be moved in synchronism with the movements of the apparatus that is governed, a tubular member for delivering fluid from said receptacle to said pan whereby the inertia forces acting on the fluid in said receptacle are adapted to cause the fluid to be elevated to said pan, and means for returning the fluid from said opening to said receptacle.

4. In a governing mechanism, the combination of a spring supported pan having an opening therein for the discharge of fluid, a fluid receptacle arranged below said pan and adapted to be moved in synchronism with the movements of the apparatus that is governed, a tubular member for delivering fluid from said receptacle to said pan whereby the inertia forces acting on the fluid in the receptacle cause the fluid to be elevated to the pan, means for returning the fluid from said opening to said receptacle, and a pivotally mounted arm operatively connected with controlling means and having a connection with said pan so as to be actuated by the latter.

In testimony whereof I affix my signature in presence of two witnesses.

EDGAR A. BURROW.

Witnesses:
R. A. WEAVER,
WYNN HAMILTON.

Copies of this patent may be obtained for five cents each, by addressing the "Commissioner of Patents, Washington, D. C."